United States Patent
Jung et al.

(10) Patent No.: US 11,471,871 B2
(45) Date of Patent: Oct. 18, 2022

(54) METHOD FOR PRODUCING GRAPHENE USING JOULE HEATING

(71) Applicant: CENTER FOR ADVANCED META-MATERIALS, Daejeon (KR)

(72) Inventors: Hyun June Jung, Daejeon (KR); Hak Joo Lee, Daejeon (KR); Jae Hyun Kim, Daejeon (KR); Bong Kyun Jang, Daejeon (KR); Kwang Seop Kim, Daejeon (KR); Se Jeong Won, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 132 days.

(21) Appl. No.: 16/954,536

(22) PCT Filed: Dec. 10, 2018

(86) PCT No.: PCT/KR2018/015586
§ 371 (c)(1),
(2) Date: Jun. 17, 2020

(87) PCT Pub. No.: WO2019/132313
PCT Pub. Date: Jul. 4, 2019

(65) Prior Publication Data
US 2020/0338545 A1    Oct. 29, 2020

(30) Foreign Application Priority Data
Dec. 28, 2017    (KR) .................. 10-2017-0181982

(51) Int. Cl.
*C01B 32/184*    (2017.01)
*B01J 37/16*    (2006.01)
*B01J 8/00*    (2006.01)

(52) U.S. Cl.
CPC .............. *B01J 37/16* (2013.01); *B01J 8/001* (2013.01); *C01B 32/184* (2017.08)

(58) Field of Classification Search
CPC .. B01J 37/16; B01J 8/001; B01J 2208/00389; C01B 32/184; C01B 32/186
See application file for complete search history.

(56) References Cited

U.S. PATENT DOCUMENTS

2014/0290565 A1*  10/2014  Kim ..................... B01J 23/50
                                                                117/94
2019/0003042 A1    1/2019  Seo et al.

FOREIGN PATENT DOCUMENTS

JP    2012-006824 A    1/2012
KR    20130114523 A  * 10/2013
(Continued)

OTHER PUBLICATIONS

English machine translation of KR20170060408A (2017).*
(Continued)

*Primary Examiner* — Richard M Rump
(74) *Attorney, Agent, or Firm* — Revolution IP, PLLC

(57) ABSTRACT

Provided is a graphene production method using Joule heating, including: a catalytic metal placement step in which a catalytic metal is disposed on a pair of electrodes disposed inside a chamber; a gas supply step in which a carbon-containing reaction gas and a carrier gas for transporting the reaction gas are supplied into the chamber; a heating step in which the catalytic metal is rapidly heated to a temperature required for synthesis of graphene; a temperature maintenance step in which the temperature of the catalytic metal is maintained to form the graphene on the catalytic metal; and a cooling step in which the catalytic metal is cooled to prevent local occurrence of hotspots on the graphene formed on the catalytic metal, wherein the heating step, the temperature maintenance step, and the cooling step constitute
(Continued)

one cycle of temperature control and the cycle is repeated for a predetermined process time.

2 Claims, 4 Drawing Sheets

(56) References Cited

FOREIGN PATENT DOCUMENTS

| | | |
|---|---|---|
| KR | 10-2016-0106832 A | 9/2016 |
| KR | 10-2016-0134369 A | 11/2016 |
| KR | 10-2017-0060408 A | 6/2017 |
| WO | 2017-027908 A1 | 2/2017 |
| WO | WO-2017029470 A1 * 2/2017 ........... C01B 32/186 |

OTHER PUBLICATIONS

Lee, Jung Min, Hae Yong Jeong, and Won Il Park. "Large-scale synthesis of graphene films by joule-heating-induced chemical vapor deposition." Journal of electronic materials 39.10 (2010): 2190-2195.*

Bointon, Thomas H., et al. "High quality monolayer graphene synthesized by resistive heating cold wall chemical vapor deposition." Advanced Materials 27.28 (2015): 4200-4206.*

International Search Report for PCT/KR2018/015586 dated May 21, 2019 from Korean Intellectual Property Office.

\* cited by examiner

METHOD FOR PRODUCING GRAPHENE USING JOULE HEATING

TECHNICAL FIELD

The present invention relates to a graphene production method, and, more particularly, to a graphene production method using Joule heating.

BACKGROUND ART

Materials composed of carbon atoms include fullerenes, carbon nanotubes, graphene, and graphite. Thereamong, graphene is a two-dimensional monolayer sheet of carbon atoms.

In particular, graphene has not only stable and excellent electrical, mechanical, and chemical properties but also good electrical conductivity, and thus allows much faster electron transfer than silicon and a much larger current flow than copper. This has been proved by experiments since a method of separating graphene from graphite was reported in 2004, and a lot of research has been done in this regard.

Since graphene can be formed in a large area as well as having electrical, mechanical, and chemical stability and good thermal and electrical conductivity, graphene is receiving attention as a basic material for electronic circuits.

In addition, graphene has electrical properties varying depending on crystal orientation thereof at a given thickness and thus can be adjusted to exhibit electrical properties desired by a user, thereby allowing easy device design. Thus, graphene can be effectively used in carbon-based electrical or electromagnetic devices.

However, typical graphene production methods require considerable time for heating and cooling. Particularly, typical graphene production methods using Joule heating have a problem of: melting and breakage of a catalytic metal due to local occurrence of hotspots on a surface of the catalytic metal.

DISCLOSURE

Technical Problem

Embodiments of the present invention have been conceived to overcome such a problem in the art and it is an aspect of the present invention to provide a graphene production method using Joule heating, in which a heating step, a temperature maintenance step, and a cooling step constitute one cycle of control over the temperature of a catalytic metal for formation of graphene and this cycle is repeated for a predetermined process time, whereby prepared graphene can have a uniform structure.

Technical Solution

In accordance with one aspect of the present invention, a graphene production method using Joule heating includes: a catalytic metal placement step in which a catalytic metal is disposed on a pair of electrodes disposed inside a chamber; a gas supply step in which a carbon-containing reaction gas and a carrier gas for transporting the reaction gas are supplied into the chamber; a heating step in which the catalytic metal is rapidly heated to a temperature required for synthesis of graphene; a temperature maintenance step in which the temperature of the catalytic metal is maintained to form the graphene on the catalytic metal; and a cooling step in which the catalytic metal is cooled to prevent local occurrence of hotspots on the graphene formed on the catalytic metal, wherein the heating step, the temperature maintenance step, and the cooling step constitute one cycle of temperature control and the cycle is repeated for a predetermined process time.

In the gas supply step, the carbon-containing reaction gas may be selectively supplied.

The carbon-containing reaction gas may be supplied at a first feed rate during the heating step and the temperature maintenance step in the cycle, and supply of the carbon-containing reaction gas may be cut off during the cooling step.

In the gas supply step, a reducing gas may be further supplied into the chamber to remove impurities from a surface of the catalytic metal.

In the heating step, electric current supplied to the catalytic metal is increased to heat the catalytic metal until the catalytic metal reaches a predetermined temperature, in the temperature maintenance step, control may be performed to maintain the amount of electric current supplied in the heating step to maintain the temperature of the catalytic metal, and, in the cooling step, a smaller amount of electric current than in the heating step may be supplied to cool the catalytic metal.

Advantageous Effects

In the graphene production method using Joule heating according to the present invention, the heating step, the temperature maintenance step, and the cooling step constitute one cycle of control over the temperature of the catalytic metal for synthesis of graphene and this cycle is repeated for a predetermined process time, whereby coverage of graphene can be precisely controlled while shortening the time required for synthesis of graphene.

In addition, the graphene production method using Joule heating according to the present invention can prevent melting and breakage of the catalytic metal due to local occurrence of hotspots on the catalytic metal, thereby allowing formation of graphene having a uniform structure.

Further, in the graphene production method using Joule heating according to the present invention, the amounts of the reaction gas and the carrier gas supplied in the heating step, the temperature maintenance step, and the cooling step are adjusted such that the total gas feed rate during one cycle of temperature control can be maintained at a predetermined constant value, thereby allowing the internal pressure of the chamber to be maintained at a constant level.

BEST MODE

Figure 1:
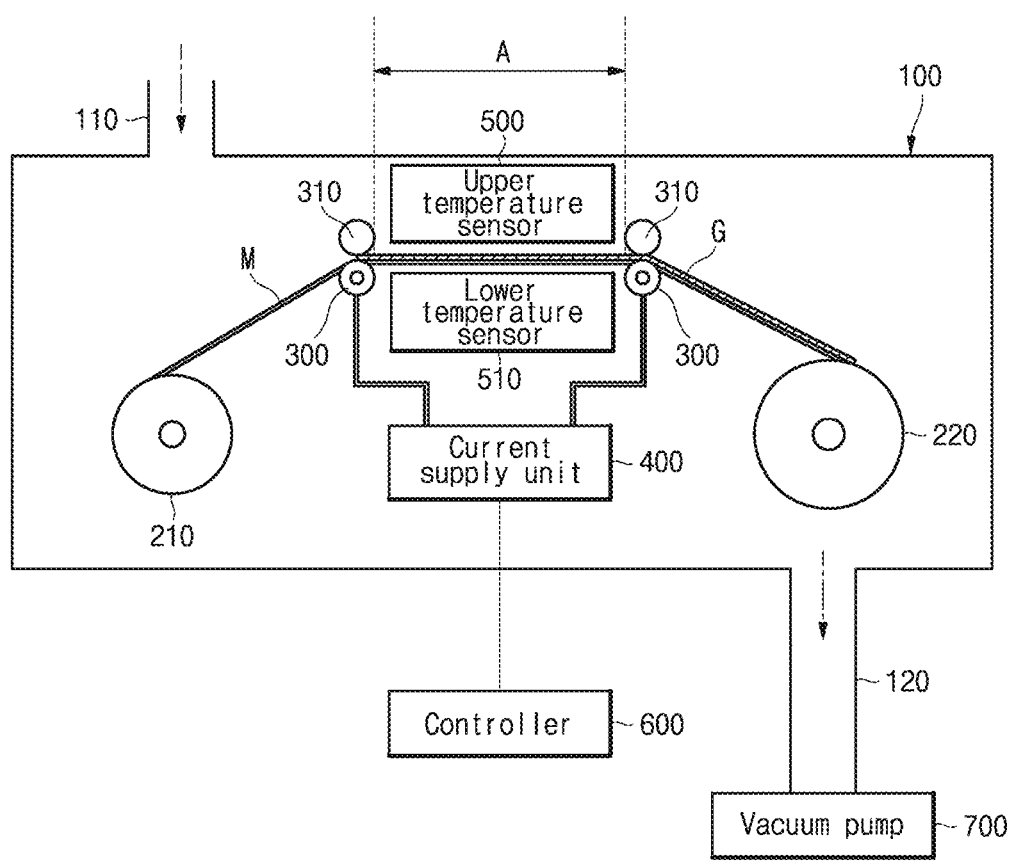
FIG. 1 is a schematic diagram of a graphene production apparatus using Joule heating according to one embodiment of the present invention.

Hereinafter, embodiments of the present invention will be described with reference to the accompanying drawings. It should be noted that like components will be denoted by like reference numerals throughout the specification and the accompanying drawings, and repeated description thereof will be omitted for clarity.

FIG. 1 is a schematic diagram of a graphene production apparatus using Joule heating according to one embodiment of the present invention.

Before describing a graphene production method using Joule heating according to one embodiment of the present invention, brief description will be given of a graphene production apparatus employed in the graphene production method according to the present invention.

Referring to FIG. 1, the graphene production apparatus according to the present invention includes a chamber 100, a feed roll 210, a winding roll 220, a pair of electrodes 300, a pair of transfer rolls 310, a current supply unit 400, and a controller 600.

The chamber 100 may be provided with a space for formation of graphene G, and may include a gas inlet 110 through which process gases are introduced into the chamber and a gas outlet 120 through which the process gases are discharged from the chamber.

The feed roll 210 is disposed inside the chamber 100 to supply a catalytic metal M for formation of the graphene G.

The winding roll 220 is disposed inside the chamber 100 to be separated a predetermined distance from the feed roll 210. Here, the winding roll 220 may receive the catalytic metal M supplied from the feed roll 210 and having the graphene G formed thereon in the form of a roll.

As the feed roll 210 and the winding roll 220 are rotated, the catalytic metal M is transferred. Accordingly, a roll-to-roll continuous process is possible.

The pair of electrodes 300 is disposed between the feed roll 210 and the winding roll 220 to support the catalytic metal M and to supply electric current for heating the catalytic metal M. Preferably, the pair of electrodes 300 closely contacts the catalytic metal M. This serves to allow electric current to be smoothly supplied to the catalytic metal M through the pair of electrodes 300. Here, the pair of electrodes 300 may include a first electrode and a second electrode separated a predetermined distance from the first electrode.

A synthesis region A for formation of the graphene G on the catalytic metal M may be formed between the pair of electrodes 300.

Each of the pair of electrodes 300 may be provided in the form of a roller to be brought into line contact or surface contact with the catalytic metal M to uniformly supply electric current to the catalytic metal M.

With the catalytic metal M in between, the pair of transfer rolls 310 faces the pair of electrodes 300, respectively, to guide transfer of the catalytic metal M in cooperation with the pair of electrodes 300.

In addition, the pair of transfer rolls 310 also serves to support the catalytic metal M to prevent the catalytic metal M from sagging due to gravity upon transferring the catalytic metal M wound on the feed roll 210 to the synthesis region A or upon winding the catalytic metal M with the graphene G formed thereon on the winding roll 220.

The current supply unit 400 is connected to the pair of electrodes 300 to supply electric current to the pair of electrodes 300.

When electric current is supplied to the pair of electrodes 300 from the current supply unit 400, the catalytic metal M is heated. That is, when electric current is supplied to the pair of electrodes 300, Joule heat is generated due to resistance offered by the catalytic metal M to heat the synthesis region A to a temperature suitable for synthesis of the graphene G.

The graphene production apparatus may further include an upper temperature sensor 500 disposed in the synthesis region A to measure a temperature distribution in the synthesis region A.

In addition, the graphene production apparatus may further include a lower temperature sensor 510 disposed under the catalytic metal M to measure the temperature of the catalytic metal M, whereby a required amount of electric current can be supplied from the current supply unit 400 based on a temperature value measured by the lower temperature sensor 510.

The controller 600 may control the amount of electric current supplied from the current supply unit 400 to the pair of the electrodes 310, 320 based on the temperature value measured by the lower temperature sensor 510 to adjust the temperature to which the catalytic metal M is heated.

Here, the controller 600 may control the current supply unit 400 such that the catalytic metal can be sequentially changed in temperature while passing through a heating step S30, a temperature maintenance step S40, and a cooling step S50, which will be described in a graphene preparation method.

In addition, the controller 600 may control the current supply unit 400 such that the heating step S30, the temperature maintenance step S40, and the cooling step S50 constituting one cycle of temperature control can be repeated for a predetermined process time.

Further, the controller 600 may control the gas inlet 110 to selectively supply a reaction gas.

The reaction gas (feed gas), which is a carbon-containing gas, may be supplied through the gas inlet 110 of the chamber 100.

The reaction gas may include, for example, at least one selected from the group consisting of methane, carbon monoxide, carbon dioxide, ethane, ethylene, ethanol, acetylene, propane, propylene, butane, butadiene, pentane, pentene, cyclopentadiene, hexane, cyclohexane, benzene, and toluene.

In addition to the reaction gas, a carrier gas for transporting the reaction gas to the catalytic metal M and a reducing gas for removing impurities from a surface of the catalytic metal M may also be supplied through the gas inlet 110.

Here, the carrier gas may include an inert gas such as helium or argon.

Here, the reducing gas may include a non-reaction gas such as hydrogen.

That is, hydrogen gas used as the reducing gas induces a reducing atmosphere to control (that is, remove) impurities in the catalytic metal through reduction with the catalytic metal.

The graphene production apparatus may further include a vacuum pump 700 disposed at the gas outlet 120 of the chamber 100 to allow the reaction gas required for synthesis of the graphene G, the carrier gas, and the reducing gas to fill the chamber 100 or to be discharged from the chamber 100.

The graphene production apparatus using Joule heating according to this embodiment may be used with each component thereof placed vertically with respect to the ground.

Next, a graphene production method using Joule heating according to one embodiment of the present invention will be described.

Figure 2:
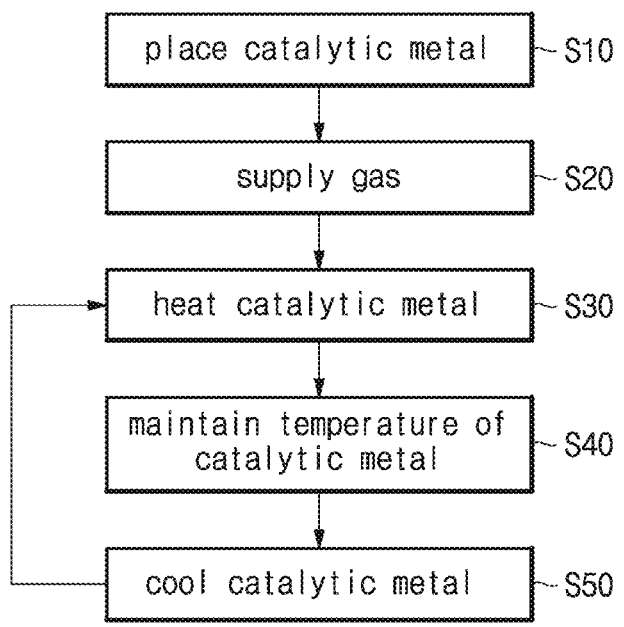
FIG. 2 is a flowchart of a graphene production method using Joule heating according to one embodiment of the present invention.

FIG. 2 is a flowchart of a graphene production method using Joule heating according to one embodiment of the present invention.

Referring to FIG. 2, the graphene production method using Joule heating according to this embodiment includes: a catalytic metal placement step S10, a gas supply step S20, a heating step S30, a temperature maintenance step S40, and a cooling step S50.

First, in the catalytic metal placement step S10, a catalytic metal M is placed on a pair of electrodes 300 disposed inside a chamber 100.

Although the catalytic metal M is described as copper in this embodiment, it will be understood that the present invention is not limited thereto and the catalytic metal M may include metals, such as cobalt, nickel, platinum, and molybdenum, or alloys thereof. Here, the catalytic metal M may be provided in the form of a foil.

More specifically, in the catalytic metal placement step S10, the catalytic metal M may be supplied in the form of a roll to a feed roll 210 and a winding roll 220 disposed inside the chamber 100 and may be supported on the pair of electrodes 300 disposed inside the chamber 100.

Next, in the gas supply step S20, a carbon-containing reaction gas and a carrier gas for transporting the reaction gas is supplied.

More specifically, in the gas supply step S20, the carbon-containing reaction gas is supplied through the gas inlet 110 of the chamber 100 to prepare graphene G. Here, supply of the reaction gas may be performed using a vacuum pump 700 connected to the chamber 100.

Although the reaction gas is described as carbon, it will be understood that the present invention is not limited thereto and the reaction gas may include, for example, at least one selected from the group consisting of methane, carbon monoxide, carbon dioxide, ethane, ethylene, ethanol, acetylene, propane, propylene, butane, butadiene, pentane, pentene, cyclopentadiene, hexane, cyclohexane, benzene, and toluene.

The carbon-containing reaction gas may be selectively supplied. That is, in one cycle described below, the carbon-containing reaction gas may be supplied during the heating step S30 and the temperature maintenance step S40 and may be cut off during the cooling step S50.

If the reaction gas is supplied during the cooling step S50, prepared graphene G can have poor quality since temperature conditions in the cooling step are not suitable for synthesis of the graphene G. Accordingly, it is desirable to supply the carbon-containing reaction gas only during the heating step S30 and the temperature maintenance step S40 in one cycle.

Here, the controller 600 may control the gas inlet 110 to selectively supply the reaction gas.

The carrier gas for transporting the reaction gas may also be supplied through the gas inlet 110.

In this embodiment, the carrier gas is described as an inert gas such as argon.

In addition, in the gas supply step S20, a reducing gas may also be supplied.

In this embodiment, the reducing gas is described as hydrogen. The reducing gas serves to remove impurities from a surface of the catalytic metal M.

The carrier gas may be supplied at a selective feed rate. That is, the feed rate of the carrier gas may be varied depending on whether the reaction gas is supplied or not. Specifically, when the reaction gas is supplied, the carrier gas is supplied at a low feed rate, whereas, when the reaction gas is not supplied, the carrier gas is supplied at a high feed rate.

In this way, the total gas feed rate during process time for synthesis of the graphene can be maintained at a constant level, thereby maintaining the internal pressure of the chamber 100 at a constant level. Details of this will be described below.

Next, in the heating step S30, the catalytic metal M is rapidly heated to a temperature required for synthesis of the graphene G.

Here, the temperature of the catalytic metal M may be increased by supplying electric current to the pair of electrodes 300 from the current supply unit 400.

That is, in the heating step S30, the controller 600 may control the current supply unit 400 to increase electric current supplied to the catalytic metal M until the temperature of the catalytic metal reaches a predetermined temperature required for synthesis of the graphene.

Next, in the temperature maintenance step S40, the temperature of the catalytic metal M is maintained for synthesis of the graphene G.

That is, in the temperature maintenance step S40, control is performed to maintain the amount of electric current supplied in the heating step S30 to maintain the temperature of the catalytic metal M during synthesis of the graphene.

In the cooling step S50, the catalytic metal M is cooled to control local occurrence of hotspots on the graphene G formed on the catalytic metal M.

That is, in the cooling step S50, a smaller amount of electric current than in the heating step S30 is supplied to cool the catalytic metal M with the graphene G formed thereon. Accordingly, it is possible to prevent occurrence of hotspots on the catalytic metal M, whereby graphene G having a uniform structure can be obtained.

In the graphene production method using Joule heating according to this embodiment, the heating step S30, the temperature maintenance step S40, and the cooling step S50 constitute one cycle of temperature control, and this cycle may be repeated for a predetermined process time.

As described above, in one cycle of temperature control, the carbon-containing reaction gas may be supplied at a first feed rate during the heating step S30 and the temperature maintenance step S40 and may be cut off during the cooling step.

In addition, in one cycle of temperature control, the carrier gas may be supplied at a first feed rate during the heating step S30 and the temperature maintenance step S40 and may be supplied at a second feed rate in the cooling step S50.

That is, during the heating step S30 and the temperature maintenance step S40 in which the reaction gas is supplied at the first feed rate, the carrier gas is supplied at the first feed rate, which is lower than the second feed rate, whereas, during the cooling step S50 in which supply of the reaction gas is cut off, the carrier gas is supplied at the second feed rate, which is higher than the first feed rate.

Accordingly, the total gas feed rate during the heating step S30 and the temperature maintenance step S40 is the sum of the first feed rate of the reaction gas and the first feed rate of the carrier gas, and the total gas feed rate during the cooling step S50 is the second feed rate of the carrier gas.

In this way, the total gas feed rate during one cycle of temperature control can be maintained at a predetermined constant value by adjusting the feed rates of the reaction gas and the carrier gas during the heating step, the temperature maintenance step, and the cooling step, whereby the internal pressure of the chamber can be maintained at a constant level.

It will be understood that the feed rate of the reducing gas, which is uniformly supplied throughout the cycle, is included in the total gas feed rate.

Figure 3:
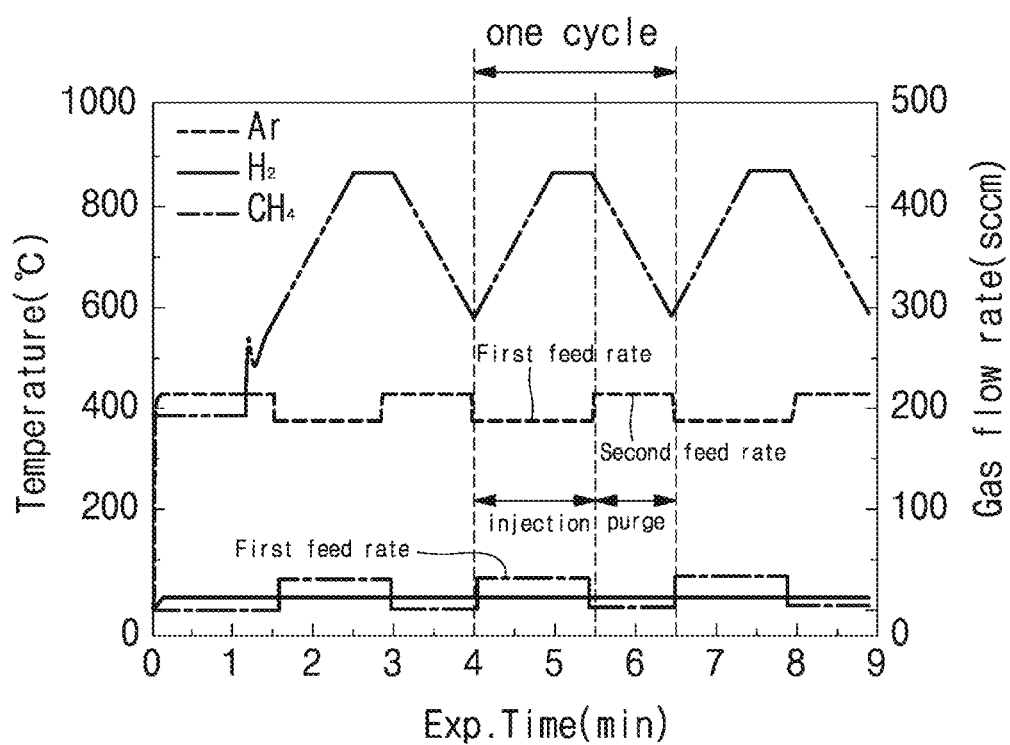
FIG. 3 is a graph showing temperature changes between steps constituting one cycle of temperature control and repetition of the cycle for a predetermined process time.

FIG. 3 is a graph showing temperature changes between steps constituting one cycle of temperature control according to one embodiment of the present invention and repetition of the cycle for a predetermined process time. In addition, the graph also shows the feed rates of carbon (for example, $CH_4$) as the reaction gas, argon (Ar) as the carrier gas, and hydrogen ($H_2$) as the reducing gas during one cycle of temperature control.

Now, a process of controlling a temperature for synthesis of the graphene G according to one embodiment of the present invention will be described with reference to FIG. 3.

Referring to FIG. 3, it may take about 2 minutes and 30 seconds to complete one cycle of temperature control for synthesis of the graphene G.

First, in the heating step S30, electric current supplied from the current supply unit 400 is increased until the catalytic metal reaches a predetermined temperature, whereby the temperature of the catalytic metal is increased to 900° C. from about 600° C. Here, the heating step S30 may take about 1 minute to complete. That is, in the heating step S30, the catalytic metal M for synthesis of the graphene G is rapidly heated.

Next, in the temperature maintenance step S40, control is performed to maintain the amount of electric current supplied in the heating step S30 to maintain the temperature of the catalytic metal M at about 900° C. Here, the temperature maintenance step may take about 30 seconds to complete. That is, in the temperature maintenance step S40, the graphene G is substantially prepared by reaction of carbon, which is the reaction gas, in the synthesis region A of the catalytic metal M.

During the heating step S30 and the temperature maintenance step S40, the reaction gas is supplied such that the graphene G is formed in the synthesis region A of the catalytic metal M.

Next, in the cooling step S50, a smaller amount of electric current than in the heating step S30 is supplied such that the temperature of the catalytic metal M is gradually decreased to about 600° C. from about 900° C. Here, the cooling step S50 may take about 1 minute to complete. That is, in the cooling step S50, the temperature of the catalytic metal M is decreased to prevent local occurrence of hotspots on the graphene G formed on the catalytic metal M, whereby prepared graphene G can have a uniform structure.

During the cooling step S50, supply of the reaction gas may be cut off and the chamber may remain purged of the reaction gas.

The reducing gas may be uniformly supplied throughout the cycle.

As described above, the heating step S30, the temperature maintenance step S40, and the cooling step S50 constitute one cycle of temperature control for synthesis of the graphene, and this cycle is repeated for a predetermined process time.

Figure 4:
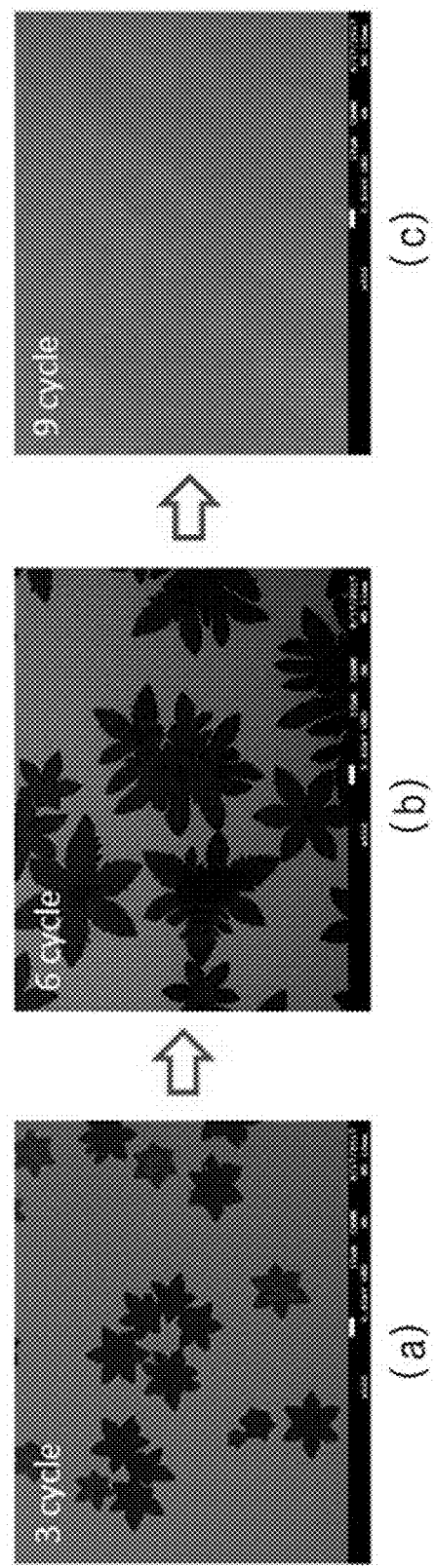
FIG. 4 shows electron micrographs of prepared graphene depending on the number of times of performing the cycle according to one embodiment of the present invention.

FIG. 4 shows electron micrographs of prepared graphene depending on the number of times of performing the cycle according to one embodiment of the present invention. FIG. 4(a) is an electron micrograph of graphene prepared by performing the cycle three times, FIG. 4(b) is an electron micrograph of graphene prepared by performing the cycle six times, and FIG. 4(c) is an electron micrograph of graphene prepared by performing the cycle nine times.

Referring to FIG. 4, it can be seen that prepared graphene G can have a more uniform structure with increasing number of times of performing the cycle for a predetermined process time.

As described above, in the graphene production method using Joule heating according to the present invention, the heating step, the temperature maintenance step, and the cooling step constitute one cycle of control over the temperature of the catalytic metal for synthesis of graphene, and this cycle is repeated for a predetermined process time, whereby coverage of graphene can be precisely controlled while shortening the time required for synthesis of graphene.

In addition, the graphene production method using Joule heating according to the present invention can prevent melting and breakage of the catalytic metal due to local occurrence of hotspots on the catalytic metal, thereby allowing formation of graphene having a uniform structure.

Further, in the graphene production method using Joule heating according to the present invention, the amounts of the reaction gas and the carrier gas supplied in the heating step, the temperature maintenance step, and the cooling step are adjusted such that the total gas feed rate during one cycle of temperature control can be maintained at a predetermined constant value, thereby allowing the internal pressure of the chamber to be maintained at a constant level.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

INDUSTRIAL APPLICABILITY

The present invention has industrial applicability to the field of synthesis of graphene using Joule heating.

The invention claimed is:

1. A graphene production method using Joule heating, comprising:
   a catalytic metal placement step in which a catalytic metal is disposed on a pair of electrodes disposed inside a chamber;
   a gas supply step in which a carbon-containing reaction gas and a carrier gas for transporting the carbon-containing reaction gas are supplied into the chamber;
   a heating step in which the catalytic metal is rapidly heated to a temperature required for synthesis of graphene;
   a temperature maintenance step in which the temperature of the catalytic metal is maintained to form the graphene on the catalytic metal; and
   a cooling step in which the catalytic metal is cooled to prevent local occurrence of hotspots on the graphene formed on the catalytic metal,
   wherein the heating step, the temperature maintenance step, and the cooling step constitute one cycle of temperature control and the cycle is repeated for a predetermined process time,
   wherein, in the gas supply step,
      a reducing gas is further supplied into the chamber to remove impurities from a surface of the catalytic metal, in the one cycle, a total gas feed rate by summing the carbon-containing reaction gas, the carrier gas, and the reducing gas is constantly maintained, a reducing gas feed rate is uniformly supplied during the one cycle, in the one cycle, the carbon-containing reaction gas is supplied at a first reaction gas feed rate during the heating step and the temperature maintenance step, and the carbon-containing reaction gas is cut off at during the cooling step, in the one cycle, the carrier gas is supplied at a first carrier gas feed rate during the heating step and the temperature maintenance step, and the carrier gas is supplied at a second carrier gas feed rate during the cooling step, each of a sum of the first reaction gas feed rate and the first carrier gas feed rate during the heating step and the temperature maintenance step and a sum of the second carrier gas feed rate during the cooling gas is constantly maintained.

2. The graphene production method according to claim 1, wherein, in the heating step, electric current is increased to heat the catalytic metal until the catalytic metal reaches a predetermined temperature, in the temperature maintenance step, control is performed to maintain the amount of electric current supplied in the heating step to maintain the temperature of the catalytic metal, and, in the cooling step, a smaller amount of electric current than in the heating step is supplied to cool the catalytic metal.

\* \* \* \* \*